(12) United States Patent
Mori et al.

(10) Patent No.: US 10,773,718 B2
(45) Date of Patent: Sep. 15, 2020

(54) VEHICLE RISK AVOIDANCE DEVICE

(71) Applicant: DENSO CORPORATION, Kariya, Aichi-pref. (JP)

(72) Inventors: Masashi Mori, Kariya (JP); Hideyuki Ikemoto, Kariya (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 42 days.

(21) Appl. No.: 16/077,885

(22) PCT Filed: Jan. 12, 2017

(86) PCT No.: PCT/JP2017/000800
§ 371 (c)(1),
(2) Date: Aug. 14, 2018

(87) PCT Pub. No.: WO2017/141585
PCT Pub. Date: Aug. 24, 2017

(65) Prior Publication Data
US 2019/0047556 A1  Feb. 14, 2019

(30) Foreign Application Priority Data

Feb. 19, 2016 (JP) .................................. 2016-030254

(51) Int. Cl.
*B60W 30/09* (2012.01)
*B60W 50/14* (2020.01)
(Continued)

(52) U.S. Cl.
CPC ........... *B60W 30/09* (2013.01); *B60C 23/064* (2013.01); *B60C 23/20* (2013.01); *B60T 7/12* (2013.01);
(Continued)

(58) Field of Classification Search
CPC .... B60W 30/09; B60W 10/184; B60W 30/02; B60W 30/0956; B60W 40/068;
(Continued)

(56) References Cited

U.S. PATENT DOCUMENTS 9,046,457 B2 * 6/2015 Hanatsuka ............ B60W 40/06
2001/0045891 A1 * 11/2001 Nakao .............. G08G 1/096716
340/426.1

(Continued)

FOREIGN PATENT DOCUMENTS

JP   H10096622 A   4/1998
JP   2002008198 A   1/2002
(Continued)

*Primary Examiner* — Yazan A Soofi
*Assistant Examiner* — Naeem Taslim Alam
(74) *Attorney, Agent, or Firm* — Harness, Dickey & Pierce, P.L.C.

(57) ABSTRACT

A tire mount sensor detects a road surface condition such as a type of a road surface and a road surface μ, and transmits road surface data indicating a detection result to a communication center. The communication center collects road surface data more precisely, and the vehicle receives the more precise road surface data from the communication center. Based on received more precise road surface data, the risk of the vehicle is determined. Thus, the road surface condition is detected using the tire mount sensor, so that the road surface condition is detected without braking. Accordingly, it is possible to detect the road surface condition with high frequency, so that the road surface condition is detected in wider area, and it is possible to perform the control more appropriately for avoiding the risk based on the road surface condition during a travel.

7 Claims, 6 Drawing Sheets

(51) Int. Cl.
*B60W 40/068* (2012.01)
*B60T 8/172* (2006.01)
*G08G 1/0967* (2006.01)
*B60C 23/06* (2006.01)
*B60C 23/20* (2006.01)
*B60W 10/184* (2012.01)
*G08G 1/01* (2006.01)
*B60W 30/02* (2012.01)
*B60T 7/12* (2006.01)
*B60T 8/1763* (2006.01)
*B60T 8/173* (2006.01)
*B60W 30/095* (2012.01)
*G08G 1/16* (2006.01)

(52) U.S. Cl.
CPC .............. *B60T 8/172* (2013.01); *B60T 8/173* (2013.01); *B60T 8/1725* (2013.01); *B60T 8/1763* (2013.01); *B60W 10/184* (2013.01); *B60W 30/02* (2013.01); *B60W 30/0956* (2013.01); *B60W 40/068* (2013.01); *B60W 50/14* (2013.01); *G08G 1/0112* (2013.01); *G08G 1/0129* (2013.01); *G08G 1/0141* (2013.01); *G08G 1/096716* (2013.01); *G08G 1/096725* (2013.01); *G08G 1/096741* (2013.01); *G08G 1/096775* (2013.01); *G08G 1/163* (2013.01); *G08G 1/166* (2013.01); *B60T 2210/12* (2013.01); *B60T 2210/14* (2013.01); *B60T 2240/03* (2013.01); *B60W 2050/143* (2013.01); *G08G 1/164* (2013.01)

(58) Field of Classification Search
CPC ............ B60W 50/14; B60W 2050/143; B60C 23/064; B60C 23/20; B60T 7/12; B60T 8/172; B60T 8/1725; B60T 8/173; B60T 8/1763; B60T 2210/12; B60T 2210/14; B60T 2240/03; G08G 1/0112; G08G 1/0129; G08G 1/0141; G08G 1/096716; G08G 1/096725; G08G 1/096741; G08G 1/096775; G08G 1/163; G08G 1/166; G08G 1/164
USPC ......................................................... 701/301
See application file for complete search history.

(56) References Cited

U.S. PATENT DOCUMENTS

| | | | | |
|---|---|---|---|---|
| 2008/0114520 | A1* | 5/2008 | Kitazaki | B60T 8/17616 701/82 |
| 2014/0343797 | A1* | 11/2014 | Naito | B60C 23/064 701/45 |
| 2016/0368501 | A1* | 12/2016 | Suzuki | B60W 40/06 |
| 2018/0141461 | A1* | 5/2018 | Sano | G08G 1/09 |

FOREIGN PATENT DOCUMENTS

| | | |
|---|---|---|
| JP | 2008265602 A | 11/2008 |
| JP | 2015174637 A | 10/2015 |
| WO | WO-2013175567 A1 | 11/2013 |

* cited by examiner

VEHICLE RISK AVOIDANCE DEVICE

CROSS REFERENCE TO RELATED APPLICATIONS

This application is a U.S. National Phase Application under 35 U.S.C. 371 of International Application No. PCT/JP2017/000800 filed on Jan. 12, 2017 and published in Japanese as WO/2017/141585 A1 on Aug. 24, 2017. This application is based on and claims the benefit of priority from Japanese Patent Application No. 2016-030254 filed on Feb. 19, 2016. The entire disclosures of all of the above applications are incorporated herein by reference.

TECHNICAL FIELD

The present disclosure relates to a vehicle risk avoidance device that detects a road surface condition while a vehicle is traveling, and performs a control for avoiding a risk during the traveling based on the road surface condition, for example, a control for notifying a driver of the risk or generating a braking force acting on the vehicle.

BACKGROUND ART

Up to now, a road surface information distribution system that measures slipperiness of a road on which the vehicle is traveling, transmits the measured slipperiness to a communication center through a vehicle communication device, and communicates the slipperiness from the communication center to another vehicle has been disclosed (refer to Patent Literature 1). Specifically, in the road surface information distribution system, a rotational speed of a tire is periodically measured and the slipperiness of the road is measured based on the rotational speed of the tire, and a level of the slipperiness of the road is quantified and transmitted to the communication center. With the use of the road surface information distribution system described above, when the vehicle travels a place where information has been already collected, a vehicle motion control taking the collected level of the slipperiness of a road into account is performed, and slip and spin of the vehicle can be avoided more accurately.

PRIOR ART LITERATURES

Patent Literature

Patent Literature 1: JP-2002-8198-A

SUMMARY

In order to detect the slipperiness of a road based on the rotational speed of a tire in a vehicle, there is a need to generate a difference between a rotation speed of the tire and a vehicle body speed, for example, by slipping a wheel by braking. This makes it difficult to detect the slipperiness of the road with a high frequency during traveling of the vehicle, thereby being incapable of detecting the slipperiness over a wide range of the road during traveling.

It is an object of the present disclosure to provide a vehicle risk avoidance device capable of detecting a road surface condition in a wider range and more appropriately performing a control for avoiding a risk during traveling based on a road surface condition.

According to an aspect of the present disclosure, a vehicle risk avoidance device includes: a tire mount sensor that is attached to a rear surface of a tire provided in the vehicle and includes a vibration detection unit for outputting a detection signal according to a magnitude of vibration of the tire, a signal processing unit for detecting a road surface condition according to vibration data indicated in the detection signal of the vibration detection unit, and a transmission unit for transmitting a calculation result of a level of a high frequency component as road surface data indicating the road surface condition; and a vehicle body side system that is arranged on a vehicle body and includes a receiver for receiving the road surface data transmitted from the transmission unit, a vehicle communication device for transmitting the road surface data to a communication center which collects road information and acquiring the road surface data indicating the road surface condition of a road, on which the vehicle is scheduled to travel, from the communication center, a road information acquisition unit for acquiring the road information, a position information acquisition unit for acquiring a current position of the vehicle, and a vehicle speed acquisition unit for acquiring a vehicle speed as a speed of the vehicle. The vehicle body side system further includes a control unit that determines the risk of the vehicle based on the road information acquired by the road information acquisition unit, the current position acquired by the position information acquisition unit, the vehicle speed acquired by the vehicle speed acquisition unit, and the road surface data acquired from the communication center, and performs the control for avoiding the vehicle from the risk when the control unit determines the risk of the vehicle.

In this manner, the road surface condition is detected by the tire mount sensor, and the risk involved in the vehicle is determined based on the road surface data indicating the detection result. More specifically, the road surface data transmitted from the tire mount sensor is transmitted to the communication center to collect more accurate road surface data so that the vehicle receives the more accurate road surface data from the communication center. The risk involved in the vehicle is determined based on the received more accurate road surface data.

In this manner, when the road surface condition is detected with the use of the tire mount sensor, the road surface condition can be detected without braking. Therefore, since the road surface condition can be detected at a higher frequency, the road surface condition can be detected in a wider range and the control for avoiding the risk during traveling based on the road surface condition can be performed more appropriately.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, embodiments of the present disclosure will be described below with reference to the drawings. In the following respective embodiments, parts identical with or equivalent to each other are denoted by the same symbols for description.

First Embodiment

A vehicle risk avoidance device 100 according to the present embodiment will be described with reference to FIGS. 1 to 9. The vehicle risk avoidance device 100 according to the present embodiment estimates a road surface condition during traveling based on vibrations applied to a tread surface of a tire provided to each wheel of a vehicle and transmits an estimation result to a communication center, and performs a notification of a risk involved in the vehicle and a vehicle motion control based on the road surface condition.

Figure 1:
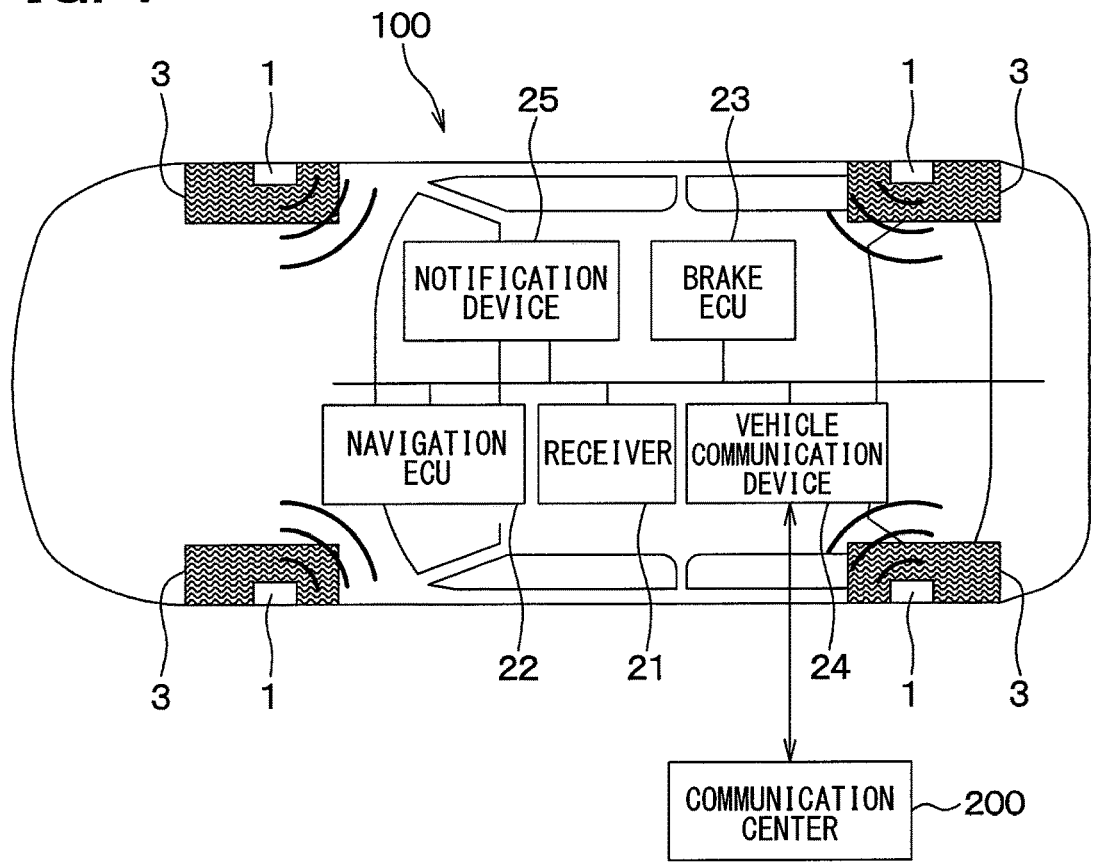
FIG. 1 is a diagram illustrating a block configuration of a state in which a vehicle risk avoidance device is installed in a vehicle according to a first embodiment.
Figure 2:
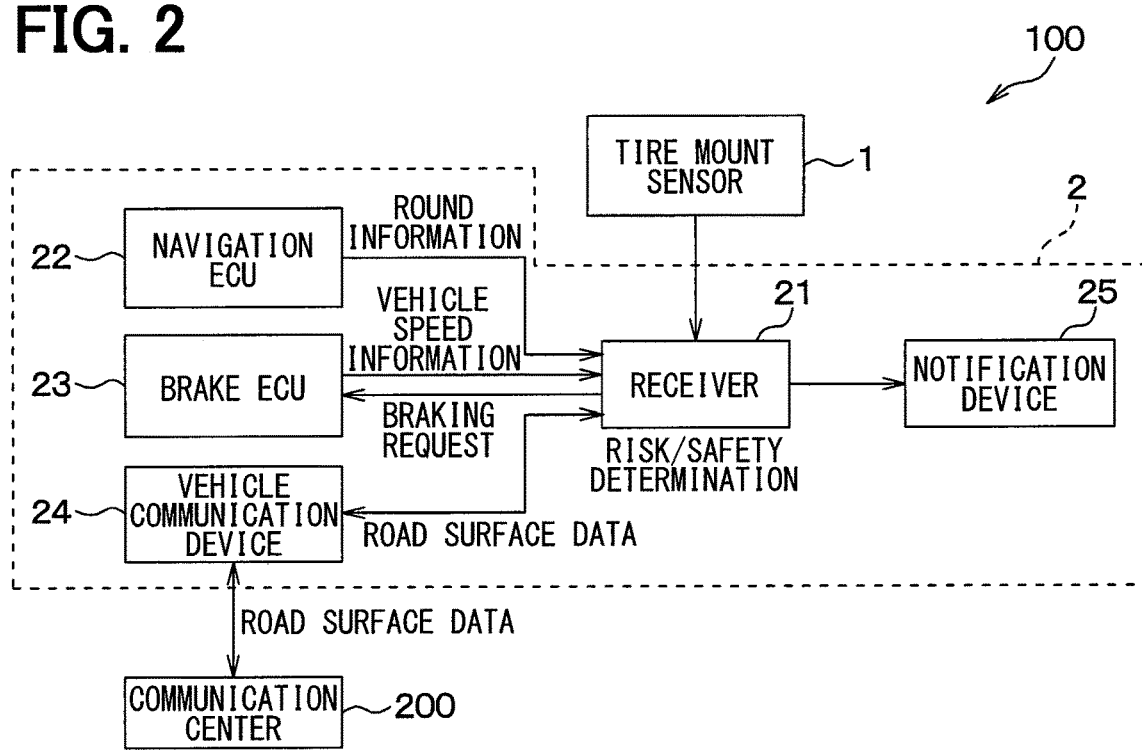
FIG. 2 is a block diagram illustrating information transmission in the vehicle risk avoidance device.

As shown in FIGS. 1 and 2, the vehicle risk avoidance device 100 is configured to include tire mount sensors 1 provided on wheel sides and a vehicle body side system 2 including respective components provided on a vehicle body side. The vehicle body side system 2 includes a receiver 21, an electronic control device for navigation control (hereinafter referred to as a navigation ECU) 22, an electronic control device for brake control (hereinafter referred to as a brake ECU) 23, a vehicle communication device 24, a notification device 25 and the like.

The vehicle risk avoidance device 100 transmits data representing a road surface condition during travel such as data indicating a road surface μ between tires 3 and a road surface on which to travel from the tire mount sensors 1. Hereinafter, the data of the road surface μ is referred to as μ data, and the data representing the road surface condition is referred to as road surface data. In the case of the present embodiment, as shown in FIG. 2, after the receiver 21 has received the road surface data transmitted from the tire mount sensor 1, the vehicle risk avoidance device 100 transmits the road surface data to a communication center 200 through the vehicle communication device 24. Conversely, the vehicle risk avoidance device 100 acquires more accurate road surface data from the communication center 200 through the vehicle communication device 24. The vehicle risk avoidance device 100 determines the risk involved in the vehicle based on the more accurate road surface data acquired from the communication center 200 and various information transmitted from the navigation ECU 22 and the brake ECU 23 in the receiver 21. When it is determined that there is the risk involved in the vehicle, the vehicle risk avoidance device 100 transmits the determination result to the notification device 25 or the like from the receiver 21 and notifies the notification device 25 or the like of the risk and the like. Specifically, the tire mount sensor 1 and the receiver 21 are configured as follows.

Figure 3:
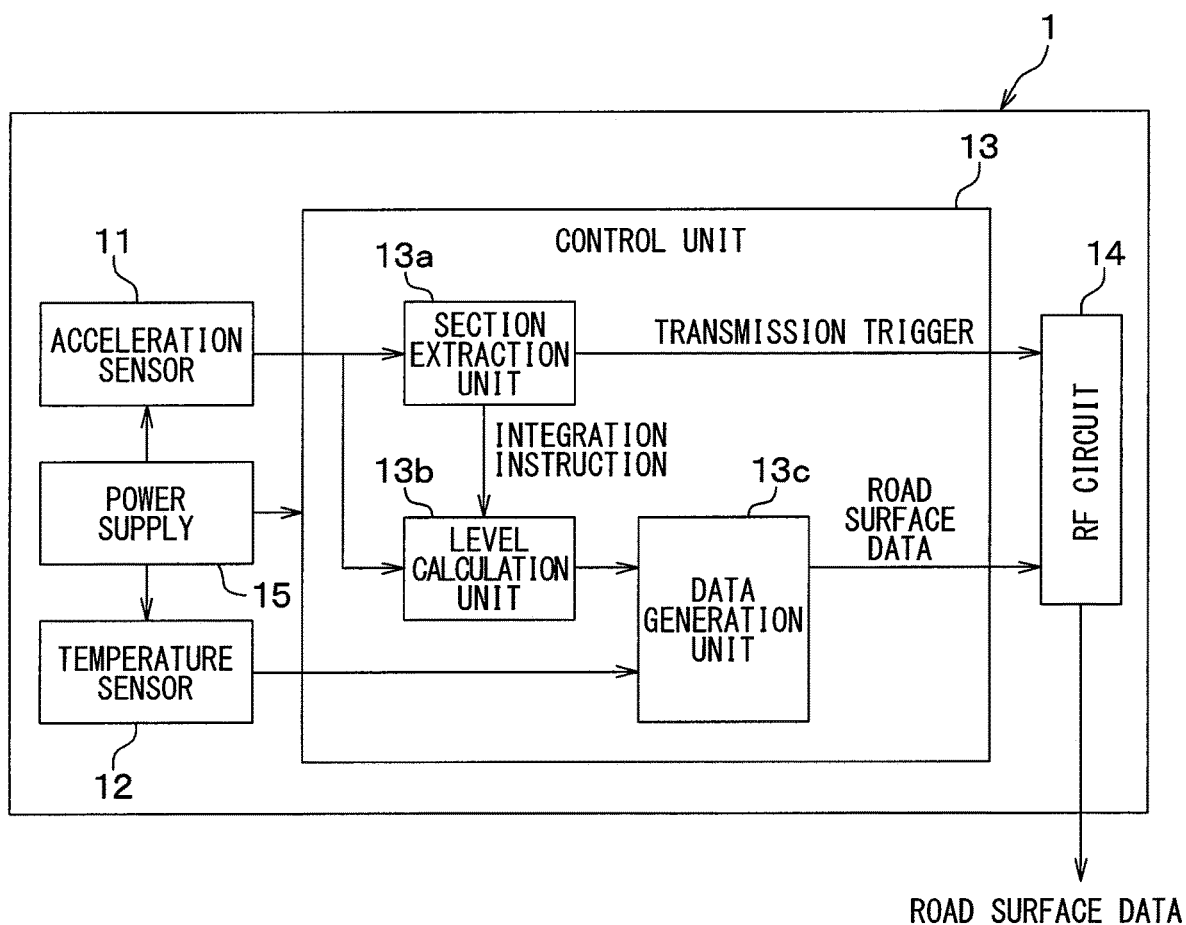
FIG. 3 is a block diagram of a tire mount sensor.
Figure 4:
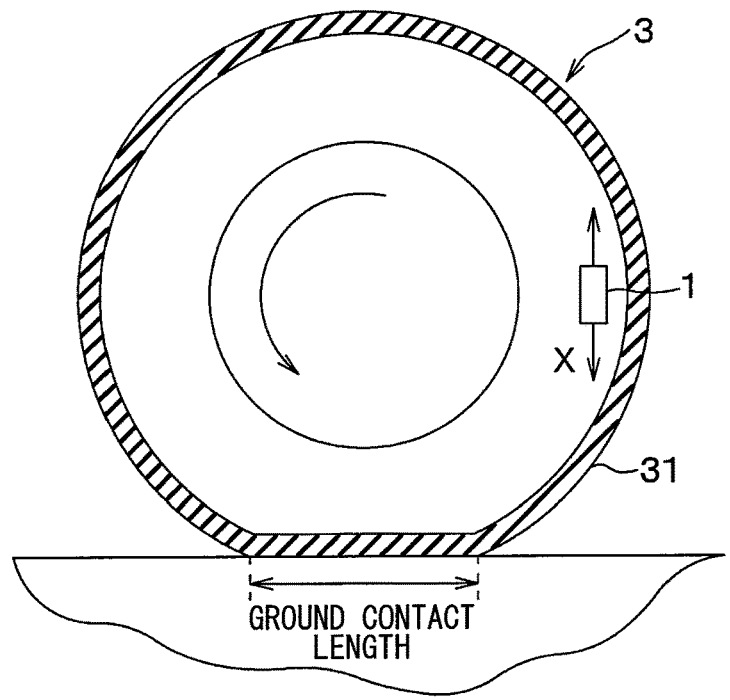
FIG. 4 is a schematic cross-sectional view of a tire to which the tire mount sensor is attached.

As shown in FIG. 3, each of the tire mount sensors 1 is provided with an acceleration sensor 11, a temperature sensor 12, a control unit 13, an RF circuit 14, and a power supply 15. As shown in FIG. 4, the tire mount sensor 1 is placed on a back surface of a tread 31 of the tire 3.

The acceleration sensor 11 configures a vibration detection unit for detecting vibration applied to the tire. For example, the acceleration sensor 11 outputs a detection signal of acceleration as the detection signal corresponding to the vibration in a direction coming in contact with a circular orbit drawn by the tire mount sensor 1 when the tire 3 rotates, that is, in a tire tangential direction indicated by an arrow X in FIG. 4.

The temperature sensor 12 outputs the detection signal corresponding to the temperature, and measures a temperature of the traveling road surface by detecting a temperature of a position of the tire 3 at which the tire mount sensor 1 is placed.

The control unit 13 corresponds to a signal processing unit, uses the detection signal of the acceleration sensor 11 as a detection signal indicative of vibration data in the tire tangential direction, processes the detection signal to obtain the road surface data, and transmits the obtained data to the RF circuit 14. Specifically, the control unit 13 extracts a ground contact section of the acceleration sensor 11 at the time of rotating the tire 3 based on the detection signal of the acceleration sensor 11, that is, a temporal change in the output voltage of the acceleration sensor 11. The term "ground contact section" as used in the present specification means a section where a portion of the tread 31 of the tire 3 corresponding to a position at which the acceleration sensor 11 is placed comes in contact with the road surface. In the case of the present embodiment, since the placement position of the acceleration sensor 11 is set as the placement place of the tire mount sensor 1, the ground contact section means the section in which the portion of the tread 31 of the tire 3 corresponding to the placement position of the tire mount sensor 1 comes in contact with the road surface.

Since a high frequency component included in the detection signal of the acceleration sensor 11 in the ground contact section indicates the road surface condition, as will be described later, the control unit 13 extracts the high frequency component from the detection signal and detects the road surface condition such as the road surface μ based on the extracted high frequency component.

Further, in the case of the present embodiment, since the temperature of the traveling road surface is measured by the temperature sensor 12, the control unit 13 detects the road surface condition based on the temperature of the traveling road surface, corrects the road surface condition obtained from the high frequency component of the detection signal from the acceleration sensor 11, and the like.

In this manner, upon detecting the road surface condition, the control unit 13 generates road surface data indicating the road surface condition and transmits the generated road surface data to the RF circuit 14. As a result, the road surface data is transmitted to the receiver 21 through the RF circuit 14.

Specifically, the control unit 13 includes a known microcomputer having a CPU, a ROM, a RAM, an I/O and the like, and performs the above processing according to programs stored in the ROM and so on. The control unit 13 includes a section extraction unit 13a, a level calculation unit 13b, and a data generation unit 13c as function units that perform those processes.

Figure 5:
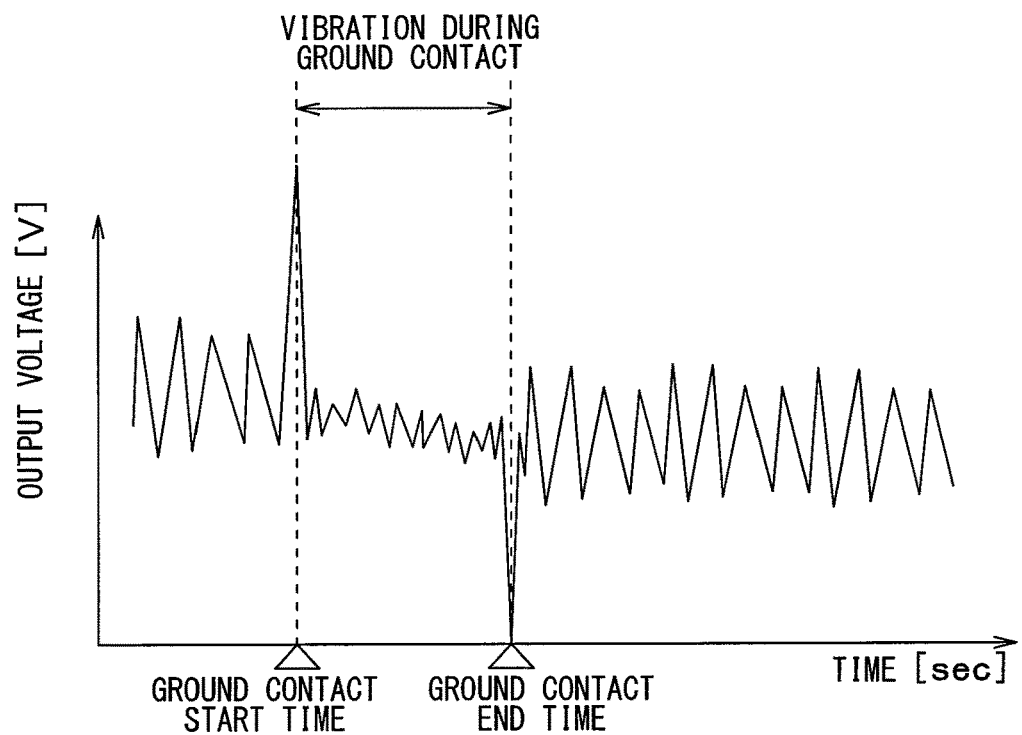
FIG. 5 is an output voltage waveform diagram of an acceleration sensor during tire rotation.

The section extraction unit 13a extracts the ground contact section by detecting a peak value of the detection signal represented by the output voltage of the acceleration sensor 11. An output voltage waveform of the acceleration sensor 11 during the tire rotation is, for example, illustrated in FIG. 5. As illustrated in the figure, at a ground contact start time when a portion of the tread 31 corresponding to the placement position of the acceleration sensor 11 starts to come in contact with the ground in association with the rotation of the tire 3, the output voltage of the acceleration sensor 11 reaches a local maximum value. The section extraction unit 13a detects the ground contact start time when the output voltage of the acceleration sensor 11 reaches the local maximum value as a timing of a first peak value. Further, as illustrated in FIG. 5, at a ground contact end time when changing from a state in which the portion of the tread 31 corresponding to the placement position of the acceleration sensor 11 comes in contact with the ground to a state in which the portion no longer comes in contact with the ground in association with the rotation of the tire 3, the output voltage of the acceleration sensor 11 reaches a local minimum value. The section extraction unit 13a detects the ground contact end time when the output voltage of the acceleration sensor 11 reaches the local minimum value as a timing of a second peak value.

The reason why the output voltage of the acceleration sensor 11 reaches the peak values at the timings described above will be described below. In other words, when the portion of the tread 31 corresponding to the placement position of the acceleration sensor 11 comes in contact with the ground in association with the rotation of the tire 3, a portion of the tire 3 which has been shaped into substantially a cylindrical surface till that time in the vicinity of the acceleration sensor 11 is pressed, and deformed into a planar shape. Upon receiving an impact at the time of the deformation, the output voltage of the acceleration sensor 11 reaches the first peak value. When the portion of the tread 31 corresponding to the placement position of the acceleration sensor 11 is separated from the ground contact surface in association with the rotation of the tire 3, the tire 3 is released from being pressed and returns to the substantially cylindrical shape from the planar shape in the vicinity of the acceleration sensor 11. Upon receiving an impact when returning the shape of the tire 3 to an original, the output voltage of the acceleration sensor 11 reaches the second peak value. As described above, the output voltage of the acceleration sensor 11 reaches the first and second peak values at the ground contact start time and the ground contact end time, respectively. Because a direction of the impact when the tire 3 is pressed is opposite to a direction of the impact when the tire 3 is released from being pressed, signs of the output voltage are also opposite to each other.

Then, the section extraction unit 13a extracts the ground contact section of the acceleration sensor 11 by extracting the data of the detection signal including the timings of the first and second peak values, and communicates a fact that the acceleration sensor 11 is in the ground contact section to the level calculation unit 13b.

Because the timing when the output voltage of the acceleration sensor 11 reaches the second peak value is set to the ground contact end time of the acceleration sensor 11, the section extraction unit 13a transmits a transmission trigger to the RF circuit 14 at that timing. As a result, the RF circuit 14 transmits the road surface data such as the µ data created by the level calculation unit 13b as will be described later. As described above, because the data transmission by the RF circuit 14 is not always performed, but is performed exclusively at the ground contact end time of the acceleration sensor 11, the power consumption can be reduced.

Upon receiving the fact that acceleration sensor 11 is in the ground contact section from the section extraction unit 13a, the level calculation unit 13b calculates the level of the high frequency component caused by the vibration of the tire 3 included in the output voltage of the acceleration sensor 11 during the ground contact section. Then, the level calculation unit 13b notifies the data generation unit 13c of the calculation result as the road surface data such as the µ data. The level calculation unit 13b calculates the level of the high frequency component as an index indicative of the road surface condition such as the road surface µ, and a reason of the calculation will be described with reference to FIGS. 6A, 6B, and 7.

Figure 6A:
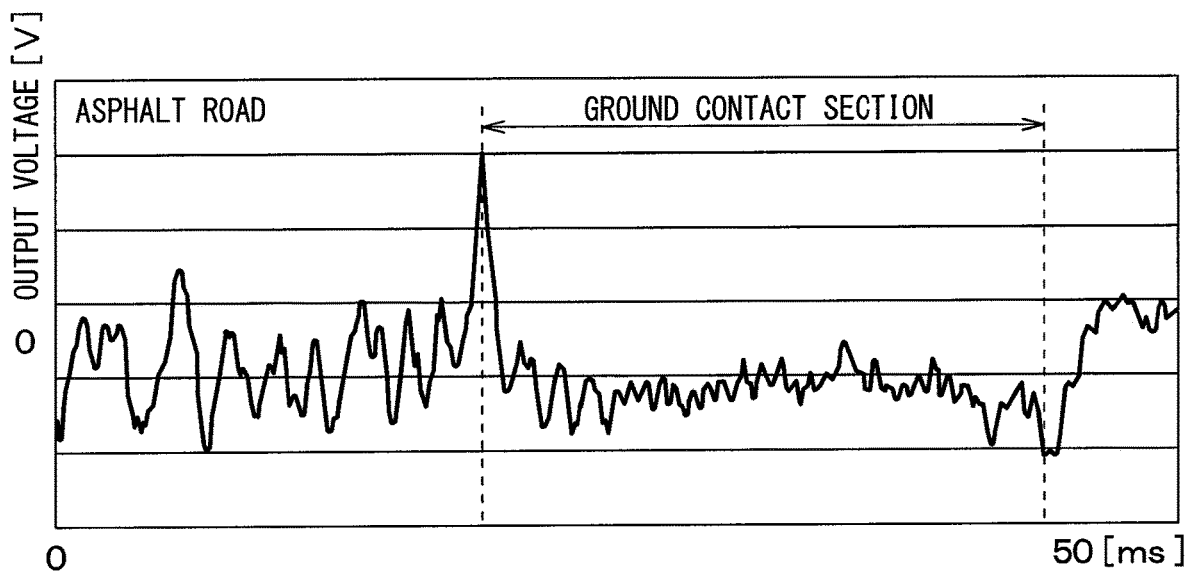
FIG. 6A is a graph showing a change in output voltage of the acceleration sensor when traveling on a high μ road surface whose road surface friction coefficient (hereinafter referred to as μ) is relatively large such as an asphalt road.
Figure 6B:
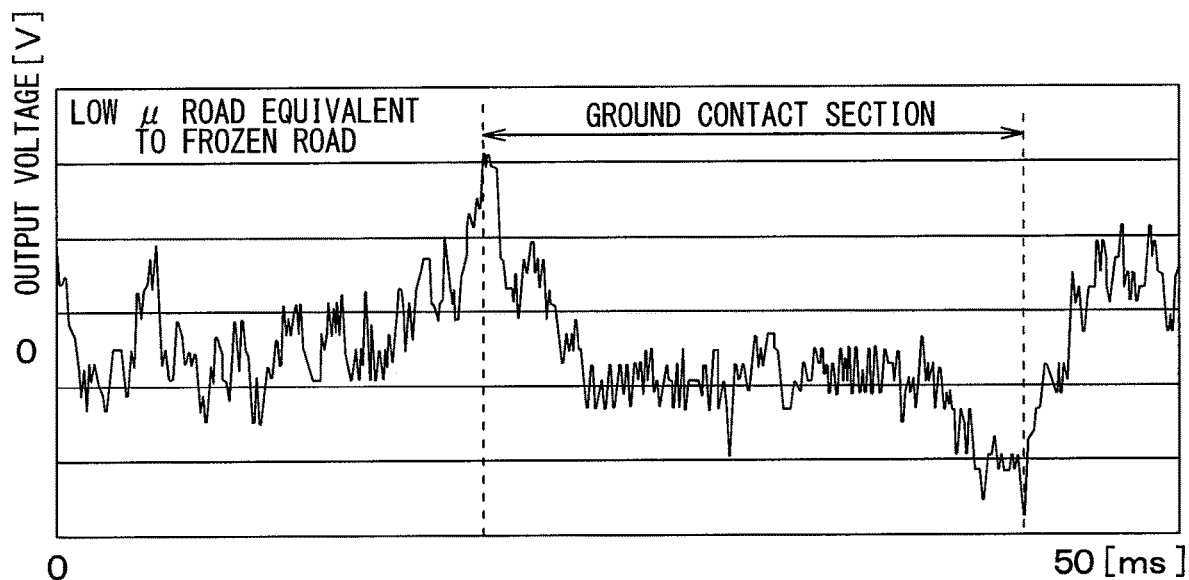
FIG. 6B is a graph showing a change in the output voltage of the acceleration sensor when traveling on a low μ road surface whose road surface μ is relatively small such as a frozen road.

FIG. 6A shows a change in the output voltage of the acceleration sensor 11 when traveling on a high µ road surface whose road surface µ is relatively large such as an asphalt road. FIG. 6B shows a change in the output voltage of the acceleration sensor 11 when traveling on a low µ road surface whose road surface µ is relatively small to the degree comparable to a frozen road.

As is understood from those figures, the first and second peak values appear at a beginning and a last of the ground contact section, that is, at the ground contact start time and the ground contact end time of the acceleration sensor 11 regardless of the road surface µ. However, the output voltage of the acceleration sensor 11 changes due to an influence of the road surface µ. For example, when the road surface µ is low as when traveling on the low µ road surface, fine high frequency vibration due to slip of the tire 3 is superimposed on the output voltage. A fine high frequency signal due to the slip of the tire 3 described above is not superimposed on the output voltage too much when the road surface µ is high as when traveling on the high µ road surface.

Figure 7:
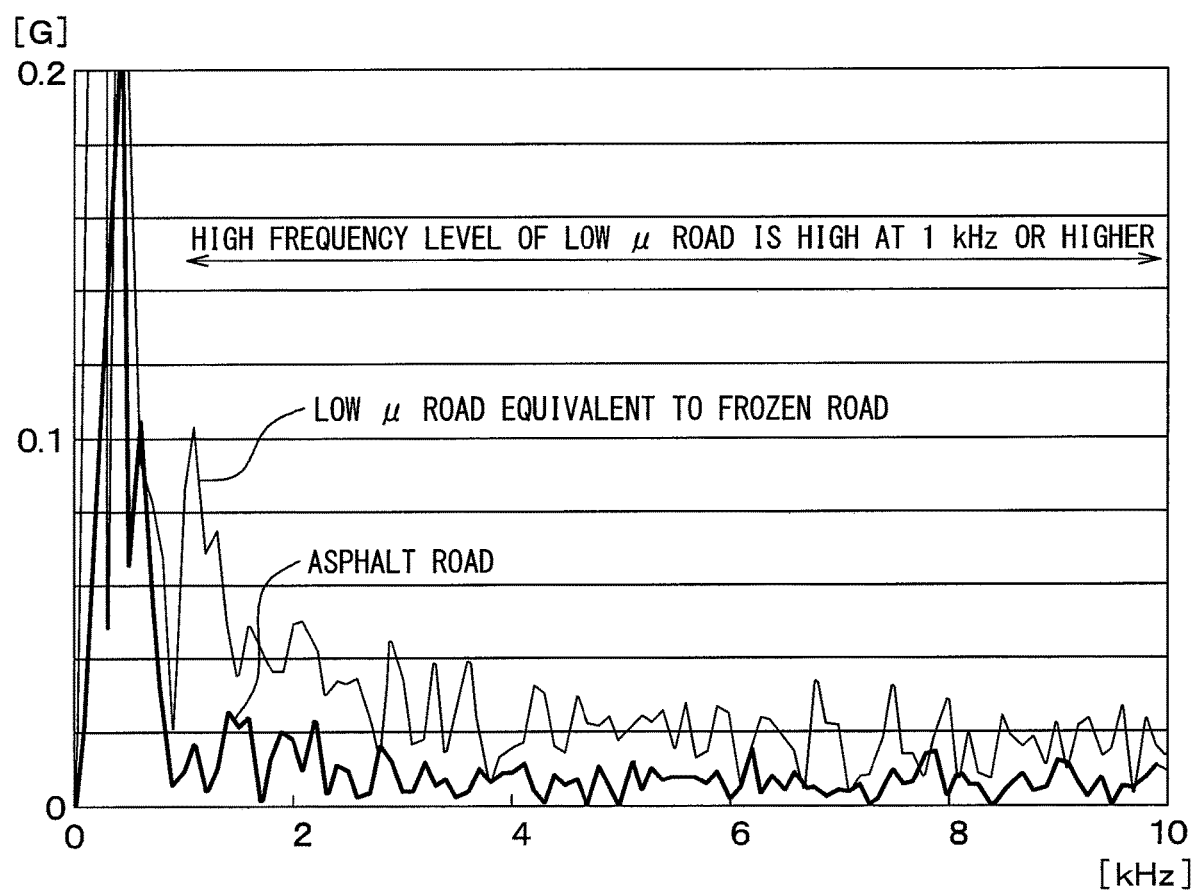
FIG. 7 is a graph showing results of performing a frequency analysis of the output voltage in a ground contact section in each of the case of traveling on the high μ road surface and the case of traveling on the low μ road surface.

For that reason, in each of the case of the high µ road surface and the case of the low µ road surface, when the frequency analysis of the output voltage in the ground contact section is performed, results illustrated in FIG. 7 are obtained. In other words, in a low frequency band, a high level is obtained when traveling on each of the high µ road surface and the low µ road surface. However, in a high frequency band of 1 kHz or higher, the level when traveling on the low µ road surface is higher than that when traveling on the high µ road surface. For that reason, the level of the high frequency component of the output voltage of the acceleration sensor 11 serves as an index indicative of the road surface condition.

Therefore, the level of the high frequency component of the output voltage of the acceleration sensor 11 in the ground contact section is calculated by the level calculation unit 13b, thereby being capable of setting the calculated level as the µ data. Also, the type of road surface corresponding to the road surface µ can be detected as the road surface condition, for example, by determining the road surface as a frozen road when the road surface µ is low from the µ data.

For example, the level of the high frequency component can be calculated by extracting the high frequency component from the output voltage of the acceleration sensor 11, and integrating the high frequency component extracted in the ground contact section. Specifically, the high frequency components of the frequency bands fa to fb assumed to change according to the road surface condition and the road surface µ are extracted by filtering or the like, and the voltages of the high frequency components of the frequency bands fa to fb extracted by frequency analysis are integrated together. For example, the voltages are charged in a capacitor not shown. With the above configuration, the charge amount when the road surface μ is higher as in the case of traveling on the high μ road surface is larger than that when the road surface μ is lower as in the case of traveling on the low μ road surface. With the charge amount as the μ data, the road surface μ can be estimated such that the road surface μ is lower as the charge amount indicated by the μ data is larger.

Basically, the data generation unit 13c generates the road surface data based on the calculation result of the level calculation unit 13b. For example, the data generation unit 13c uses the μ data as it is as the road surface data, or obtains the road surface condition such as the frozen road and the asphalt road according to the μ data, and generates the data indicating the road surface condition as the road surface data.

Further, as described above, in the case of the present embodiment, the temperature of the traveling road surface is measured by the temperature sensor 12. Based on the measured temperature, the data generation unit 13c acquires the road surface temperature by receiving the detection signal of the temperature sensor 12, detects the type of the road surface according to the acquired road surface temperature, and corrects the μ data or the type of the road surface obtained from the μ data.

For example, when the road surface temperature detected by the temperature sensor 12 is minus, the data generation unit 13c detects that the road surface is in a frozen state as the type of road surface. Further, when the μ data obtained from the high frequency component of the detection signal from the acceleration sensor 11 or the type of the road surface indicated by the μ data does not match the road surface temperature detected by the temperature sensor 12, the data generation unit 13c corrects the unmatched data or type or does not employ the unmatched data or type as a detection result of the road surface condition. For example, in the case where the type of the road surface obtained from the high frequency component of the detection signal of the acceleration sensor 11 is in the frozen state, when the road surface temperature detected by the temperature sensor 12 is 40° C., it is conceivable that there is an error in the detection result of the type of the road surface which is in the frozen state. In that case, the data generation unit 13c does not employ the result transmitted from the level calculation unit 13b as the detection result of the type of the road surface. Similarly, when the road surface μ indicated by the μ data does not match the type of the road surface obtained from the road surface temperature, for example, when the road surface μ indicated by the μ data is high although the type of the road surface is detected as the frozen state based on the road surface temperature, the road surface μ indicated by the μ data is corrected and set to a value lower than that before correction.

The RF circuit 14 configures a transmission unit that transmits the road surface data such as the μ data transmitted from the data generation unit 13c to the receiver 21. A communication between the RF circuit 14 and the receiver 21 can be implemented by a known short-range wireless communication technology such as Bluetooth (registered trademark). Timing at which the road surface data is transmitted is arbitrary, but as described above, in the present embodiment, the transmission trigger is transmitted from the section extraction unit 13a at the ground contact end time of the acceleration sensor 11 to transmit the road surface condition data from the RF circuit 14. As described above, because the data transmission by the RF circuit 14 is not always performed, but is performed exclusively at the ground contact end time of the acceleration sensor 11, the power consumption can be reduced.

The road surface data is transmitted together with unique identification information (hereinafter referred to as "ID information") on the wheel provided for each of the tires 3 equipped in the vehicle in advance. Since a position of each wheel can be identified by a known wheel position detection device for detecting to which position of the vehicle the wheel is attached, the road surface data is transmitted to the receiver 21 together with the ID information, thereby being capable of discriminating which wheel the data is related to.

On the other hand, the receiver 21 receives the road surface data transmitted from the tire mount sensor 1 and performs processing for outputting the road surface data to the vehicle communication device 24. Based on the above processing, the road surface data is transmitted from the vehicle communication device 24 to the communication center 200 that collects the road information and the like.

In addition, the receiver 21 performs a process of acquiring the more accurate road surface data from the communication center 200 through the vehicle communication device 24. Further, the receiver 21 also performs a process of acquiring road information to be traveled, for example, curvature information on a curve (hereinafter referred to as round information) from the navigation ECU 22, and also acquiring vehicle speed information from the brake ECU 23. The receiver 21 extracts the road surface data of the road to be traveled from the road surface data acquired from the communication center 200, and determines the risk involved in the vehicle based on the road surface data, the road information obtained from the navigation ECU 22, and the vehicle speed information obtained from the brake ECU 23. In other words, since the road surface data transmitted from the communication center 200 includes data on roads on which the vehicle is scheduled to travel, the receiver 21 determines the risk involved in the vehicle based on the data on a place where the vehicle is scheduled to travel. If the determination result indicates that the vehicle has a risk, the receiver 21 performs various processes according to the risk involved in the vehicle.

For example, if the receiver 21 determines that there is the risk involved in the vehicle, the receiver 21 transmits a control signal for performing the notification of the fact to the notification device 25. In addition, the receiver 21 outputs a request signal for performing a vehicle motion control of generating a braking force acting on the vehicle by transmitting a braking request to the brake ECU 23 as necessary.

More specifically, the receiver 21 stores the round information corresponding to a change in the road surface μ and a map or a function expression indicating a relationship between a vehicle speed and the risk involved in the vehicle, and the receiver 21 determines the risk involved in the vehicle based on the map or a relational expression corresponding to the road surface μ indicated by the road surface data. For example, in the map or relational expression, the relationship between a radius of curvature of a curve of the road and a vehicle speed at which the vehicle can turn the curve is determined for each road surface μ, and as the road surface μ decreases more, the vehicle speed at which the vehicle can turn the curve having the same radius of curvature is lower. In the case where the receiver 21 continues to travel at the current vehicle speed, with the use of the map or the relational expression described above, the receiver 21 determines whether the vehicle can turn the curve of the road on which to be scheduled to travel, or not, determines that there is no risk involved in the vehicle if the vehicle can turn the curve, and determines that there is a risk involved in the vehicle if the vehicle cannot turn the curve.

In this example, the case in which the map or the relational expression corresponding to the road surface μ is used as the determination of the risk involved in the vehicle has been described. Alternatively, a map or a relational expression corresponding to the type of the road surface can also be used. Further, the risk involved in the vehicle can be determined based on not only the relationship between the radius of curvature of the curve of the road and the vehicle speed but also only a relationship between the road surface μ and the vehicle speed. For example, since a braking distance becomes longer as the road surface μ is lower, it is determined that there is the risk involved in the vehicle when the braking distance assumed from the road surface μ and the vehicle speed is long. Thus, the risk involved in the vehicle can be determined based on information other than the radius of curvature of the curve of the road and the vehicle speed.

The navigation ECU 22 is provided in the navigation system and acquires information from a non-transitory tangible storage medium such as a memory that stores the road information and the like, and measures the current position of the vehicle based on the position information of a GPS (global positioning system) satellite. In other words, the navigation ECU 22 performs various processes relating to a road guidance and the like. The vehicle risk avoidance device 100 according to the present embodiment uses road information and current position information handled by the navigation ECU 22. Specifically, as described above, the road information is used for determining the risk involved in the vehicle, and is transmitted from the navigation ECU 22 to the receiver 21. The current position information is transmitted from the navigation ECU 22 to the vehicle communication device 24, and when the road surface data is transmitted from the vehicle communication device 24 to the communication center 200, the current position information is transmitted together with the road surface data. As a result, in the communication center 200, it can be grasped from what position the road surface μ or the type of the road surface indicated by the road surface data is derived.

In the above description, the navigation ECU 22 has been described as an example of the road information acquisition unit that acquires the road information and the position information acquisition unit that acquires the information on the current position. Alternatively, a device other than the navigation ECU 22 may be used. For example, a mobile device such as a cellular phone may exchange information with the respective units of the vehicle body side system 2, and the mobile device may be used as the road information acquisition unit or the position information acquisition unit. Further, an installation position of the communication system for performing a communication with the communication center 200 installed at each place such as a road may be set as the current position of the vehicle.

The brake ECU 23 configures a braking control device that performs various brake controls. The brake ECU 23 can drive an actuator for a brake fluid pressure control to automatically generate a brake fluid pressure, and pressurize a wheel cylinder to generate a braking force. In addition, the brake ECU 23 can independently control the braking force of each wheel. Therefore, when a braking request is issued from the receiver 21 when it is determined that there is the risk involved in the vehicle, a desired braking force is generated for the wheel responsive to the braking request, so that the braking force can be generated for the vehicle. In addition, the brake ECU 23 carries out vehicle speed calculation or the like based on a detection signal of a wheel speed sensor not shown or the like, and transmits the calculation result to the receiver 21 as the vehicle speed information. In this example, the brake ECU 23 is exemplified as the vehicle speed acquisition unit. Alternatively, the vehicle speed may be acquired from other than the brake ECU 23.

The vehicle communication device 24 is capable of performing a communication between the road and the vehicle, and exchanges information with the communication center 200 through a communication system not shown installed on a road or the like, for example. In the case of the present embodiment, the vehicle communication device 24 performs a function of transmitting the road surface data transmitted from the receiver 21 to the communication center 200 and receiving the more accurate road surface data from the communication center 200.

The notification device 25 is configured with, for example, a meter display device and is used for notifying a driver that there is a risk involved in the vehicle. In the case where the notification device 25 is configured by the meter display device, the notification device 25 is disposed in a place where the driver can visually recognize the notification device 25 while driving the vehicle, and is installed in an instrument panel of the vehicle, for example. Upon receiving a control signal indicating that there is a risk involved in the vehicle from the receiver 21, the meter display device displays the risk in a mode with which a content of the risk can be grasped, thereby being capable of visually notifying the driver of the risk.

The notification device 25 can also be configured with a buzzer, a voice guidance device, or the like. In that case, the notification device 25 can audibly notify the driver of the risk by a buzzer sound or voice guidance. In addition, although the meter display device has been exemplified as the notification device 25 for notifying visual information, the notification device 25 may be configured by a display unit that displays information such as a head-up display.

The vehicle risk avoidance device 100 according to the present embodiment is configured as described above. It is to be noted that the respective units of the vehicle body side system 2 are connected to each other over an in-vehicle LAN (abbreviation of local area network) such as CAN (abbreviation of controller area network communication), for example. For that reason, the respective units can communicate information with each other over the in-vehicle LAN.

On the other hand, the communication center 200 that exchanges information on the road surface data with the vehicle risk avoidance device 100 performs a business of collecting the road information and providing the road information to the vehicles or the like. The communication center 200 may communicate directly with the vehicle communication device 24, but the communication center 200 can communicate with the vehicle communication device 24 through the communication system installed at each place such as a road.

In the case of the present embodiment, the communication center 200 manages the information on the road surface condition for each place of the respective roads in the map data as a database, and maps the road surface condition that changes every moment on the basis of the received road surface data. In other words, the communication center 200 updates the information on the road surface condition for each place of the respective roads in the map data based on the received road surface data. The communication center 200 provides the road surface data to the vehicle from the database.

Specifically, the communication center 200 collects the road surface data of the road on which the vehicle has traveled, which is transmitted from the vehicle, and updates the road surface data of each road in the map data based on the road surface data. In addition, the communication center 200 also collects weather information and the like, corrects the respective road surface data based on the weather information and the like, and updates the respective road surface data as more reliable road surface data. For example, the communication center 200 acquires information on a snow accumulation amount and a frozen road surface as the weather information, and with respect to snow-covered road surface and the frozen road surface, updates the road surface data corresponding to them, to thereby sequentially store the more accurate road surface data. The communication center 200 provides the vehicle with the road surface data stored in the database so as to transmit the more accurate road surface data to the vehicle. At that time, since the communication center 200 collects the road surface data from a large number of vehicles and updates the road surface data of the respective roads in the map data stored in the database, each vehicle can acquire not only the road surface data of the current position but also the road surface data of the road on which to be scheduled to travel.

Subsequently, the operation of the vehicle risk avoidance device 100 according to the present embodiment will be described with reference to flowcharts shown in FIGS. 8 and 9.

First, in the tire mount sensor 1 of each wheel, the control unit 13 extracts a high frequency component from the detection signal of the acceleration sensor 11, that is, the output voltage, and detects the road surface μ and the type of the road surface based on the high frequency component extracted during the ground contact section. Then, the road surface data including the μ data indicating the road surface μ or the type of the road surface is created, and a frame storing the road surface data is transmitted to the receiver 21 through the RF circuit 14.

Figure 8:
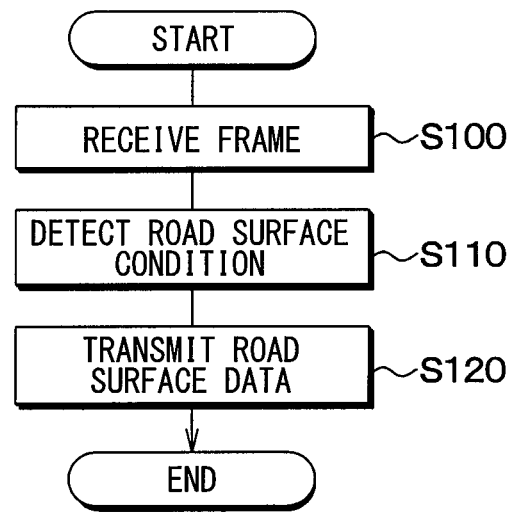
FIG. 8 is a flowchart of a road surface data transfer process.

Based on the above road surface data, the receiver 21 provided on the vehicle body side exchanges the road surface data shown in FIG. 8. Specifically, the receiver 21 receives the frame in Step S100, receives the road surface data from the tire mount sensor 1, and reads the information on the μ data indicating the road surface μ and the type of the road surface from the road surface data in Step S110 to detect the road surface condition such as the road surface μ or the type of road surface. Then, in Step S120, the extracted data or the received road surface data is transmitted to the vehicle communication device 24 as it is or after having been converted into a predetermined protocol. As a result, the road surface data indicating the road surface μ detected by the vehicle, the type of road surface, and the like are transmitted to the communication center 200. As a result, the communication center 200 adds the weather information and the like, and updates the road surface data of each road in the map data managed as the database to the latest data. The more accurate road surface data after updating from the database is provided to the vehicle from the communication center 200.

Figure 9:
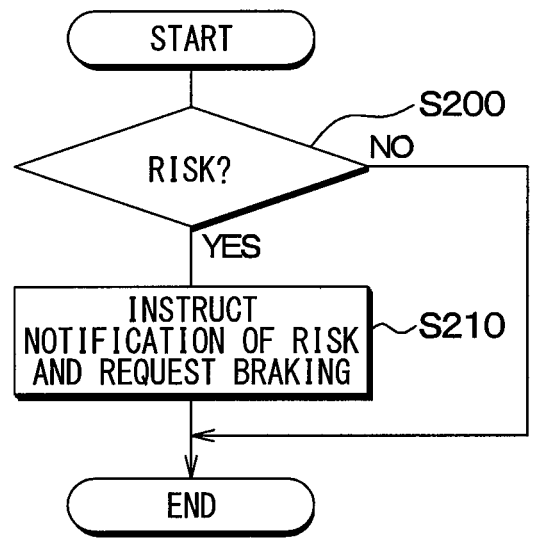
FIG. 9 is a flowchart of a risk addressing process.

In addition, the receiver 21 also executes a risk addressing process shown in FIG. 9 based on the road surface data. First, in Step S200, the risk involved in the vehicle is determined based on the road surface data. In other words, since the road surface data transmitted from the communication center 200 includes data on roads on which the vehicle is scheduled to travel, the receiver 21 determines the risk involved in the vehicle based on the data on a place where the vehicle is scheduled to travel. For example, as described above, the receiver 21 determines the risk involved in the vehicle based on the map or the relational expression corresponding to the road surface μ indicated by the road surface data. In this example, if it is determined that there is the risk involved in the vehicle, the process proceeds to Step S210 to output a control signal instructing the notification device 25 to notify that there is the risk involved in the vehicle. In addition, the receiver 21 outputs a request signal for performing a vehicle motion control of generating a braking force acting on the vehicle by transmitting a braking request to the brake ECU 23 as necessary. At that time, a braking request can be issued according to the content of the risk so that the braking force can be generated for all of the wheels, or the braking force can be generated for a specific wheel in order to avoid spinning of the vehicle.

This makes it possible for the driver to take appropriate measures such as decelerating the vehicle based on the notification of the risk by the notification device 25. Further, as necessary, with the execution of the vehicle motion control for avoiding the risk involved in the vehicle, even if the driver cannot instantaneously address the risk involved in the vehicle, the risk involved in the vehicle can be avoided.

As described above, in the vehicle risk avoidance device 100 according to the present embodiment, the road surface condition such as the road surface μ and the type of road surface is detected by the tire mount sensor 1, and the risk involved in the vehicle is determined based on the road surface data indicating the detection result. More specifically, the road surface data transmitted from the tire mount sensor 1 is communicated to the communication center 200 to collect more accurate road surface data so that the vehicle receives the more accurate road surface data from the communication center 200. The risk involved in the vehicle is determined based on the received more accurate road surface data.

In this manner, if the road surface condition is detected with the use of the tire mount sensor 1, the road surface condition can be detected without braking. Therefore, since the road surface condition can be detected at a higher frequency, the road surface condition can be detected in a wider range and the control for avoiding the risk during traveling based on the road surface condition can be performed more appropriately.

Second Embodiment

In the present embodiment, the process to be executed by the receiver 21 is changed as compared with the first embodiment, and other processes are identical with those in the first embodiment. Therefore, only parts different from those in the first embodiment will be described.

As described above, in the first embodiment, the receiver 21 determines the risk involved in the vehicle based on the road surface data transmitted from the communication center 200. On the other hand, in the present embodiment, the receiver 21 determines whether there is the risk involved in the vehicle, or not, based on not the road surface data transmitted from the communication center 200, but the road surface data indicating the road surface condition detected by the tire mount sensor 1 of the host vehicle. Specifically, the road surface data transmitted from the tire mount sensor 1 is used when executing the process of determining the risk involved in the vehicle in Step S200 in FIG. 9.

This makes it possible to determine the risk involved in the vehicle based on the road surface condition detected in real time without waiting for the road surface data from the communication center 200. In particular, when the vehicle is traveling in a region where it is difficult to communicate with the communication center 200, the above configuration is effective because the risk involved in the vehicle can be determined based on only the road surface data detected by the host vehicle.

Also, even in the present embodiment, the receiver 21 transmits the road surface data indicating the road surface condition detected by the tire mount sensor 1 to the communication center 200. For that reason, in the communication center 200, the road surface data that changes from moment to moment can be mapped based on the road surface data transmitted from the vehicle.

Other Embodiments

Although the present disclosure has been described in accordance with the embodiments described above, the present disclosure is not limited to the above embodiments, but encompasses various modifications and modifications within the equivalent scope. In addition, it should be understood that various combinations or aspects, or other combinations or aspects, in which only one element, one or more elements, or one or less elements are added to the various combinations or aspects, also fall within the scope or technical idea of the present disclosure.

For example, the first embodiment and the second embodiment described above are not independent of each other and can be combined with each other. For example, when a communication between the vehicle communication device 24 and the communication center 200 can be performed, the risk involved in the vehicle is determined based on the road surface data transmitted from the communication center 200 as in the first embodiment. When a situation in which the communication between the vehicle communication device 24 and the communication center 200 cannot be performed for a predetermined period continues, the risk involved in the vehicle is determined based on the road surface data transmitted from the tire mount sensor 1 of the host vehicle as in the second embodiment. With the above configuration, when the communication between the vehicle communication device 24 and the communication center 200 can be performed, the risk involved in the vehicle can be determined based on the more accurate road surface data, and even when the communication cannot be performed, the risk involved in the vehicle can be determined based on the road surface data detected by the host vehicle.

In the above embodiment, the ground contact section is identified based on the detection signal of the acceleration sensor 11 configuring the vibration detection unit, and the calculation result of the level of the high frequency component in the detection signal in the ground contact section is used as the road surface data indicating the road surface condition. However, this configuration merely shows one example of a method for detecting the road surface condition with the use of the detection signal by the vibration detection unit, and the road surface condition may be detected by another method using the detection signal by the vibration detection unit.

Further, in the case of the embodiments described above, in addition to the determination of the risk involved in the vehicle based on the road information, the current position information, the vehicle speed, and the road surface data transmitted from the communication center 200, the receiver 21 functions as a control unit for instructing the notification device 25 to notify the risk involved in the vehicle. However, this configuration is merely an example, and a control unit may be provided separately from the receiver 21, or another ECU such as the navigation ECU 22 or the brake ECU 23 may be caused to function as the control unit.

What is claimed is:
1. A vehicle risk avoidance device that performs a control for avoiding a risk to a vehicle, the vehicle risk avoidance device comprising:
a tire mount sensor that is attached to a rear surface of a tire provided in the vehicle and includes
an acceleration sensor configured to output a detection signal based on a magnitude of a vibration of the tire,
a control unit including a processor and configured to detect a road surface condition based on vibration data indicated in the detection signal of the acceleration sensor, and
a radio frequency (RF) circuit configured to transmit road surface data indicating the road surface condition; and
a vehicle body side system that is arranged on a vehicle body and includes
a receiver configured to receive the road surface data transmitted by the RF circuit,
a vehicle communication device configured to transmit the road surface data to a communication center that collects road information, and to acquire the road surface data indicating the road surface condition of a road on which the vehicle is scheduled to travel from the communication center,
a navigation electronic control unit (ECU) configured to acquire the road information and a current position of the vehicle, and
a brake ECU configured to acquire a vehicle speed as a speed of the vehicle, wherein:
the vehicle body side system further includes a control unit configured to
determine the risk to the vehicle based on the road information and the current position acquired by the navigation ECU, the vehicle speed acquired by the brake ECU, and the road surface data acquired from the communication center, and
to perform the control for avoiding the risk to the vehicle, in response to determining the risk to the vehicle;
in response to the vehicle communication device acquiring the road surface data from the communication center, the control unit of the vehicle body side system is further configured to determine the risk to the vehicle based on the road surface data acquired from the communication center;
in response to the vehicle communication device not acquiring the road surface data from the communication center, the control unit of the vehicle body side system is further configured to determine the risk to the vehicle based on the road surface data acquired from the tire mount sensor;
the control unit of the tire mount sensor is further configured to
identify a ground contact section in one rotation of the tire where a portion of the tire corresponding to an arrangement position of the acceleration sensor contacts the ground, and
calculate a level of a high frequency component of the detection signal only in the ground contact section; and the RF circuit is further configured to transmit a calculation result of the level of the high frequency component as the road surface data to indicate the road surface condition.

2. The vehicle risk avoidance device according to claim 1, wherein:
the vehicle communication device is further configured to transmit the road surface data transmitted by the tire mount sensor to the communication center; and
in response to the road surface information in a database of map data being updated by the communication center based on the road surface data, the vehicle communication device is further configured to acquire the road surface data indicating the road surface condition of the road on which the vehicle is scheduled to travel from the updated database.

3. A vehicle risk avoidance device that performs a control for avoiding a risk to a vehicle, the vehicle risk avoidance device comprising:
a tire mount sensor that is attached to a rear surface of a tire provided in the vehicle and includes an acceleration sensor configured to output a detection signal according to a magnitude of vibration of the tire, a control unit including a processor and configured to detect a road surface condition based on vibration data indicated by the detection signal of the acceleration sensor, and a radio frequency (RF) circuit configured to transmit road surface data indicating the road surface condition; and
a vehicle body side system that is arranged on a vehicle body and includes a receiver configured to receive the road surface data transmitted by the transmission unit, a navigation electronic control unit (ECU) configured to acquire road information and a current position of the vehicle, and a brake ECU configured to acquire a vehicle speed as a speed of the vehicle, wherein:
the vehicle body side system further includes a control unit configured to determine the risk to the vehicle based on the road information and the current position acquired by the navigation ECU, the vehicle speed acquired by the brake ECU, and the road surface data received by the receiver, and to perform the control for avoiding the risk to the vehicle, in response to determining the risk to the vehicle;
the control unit of the tire mount sensor is further configured to
identify a ground contact section in one rotation of the tire where a portion of the tire corresponding to an arrangement position of the acceleration sensor contacts the ground, and
calculate a level of a high frequency component of the detection signal only in the ground contact section; and the RF circuit is further configured to transmit a calculation result of the level of the high frequency component as the road surface data to indicate the road surface condition.

4. The vehicle risk avoidance device according to claim 1, wherein:
the vehicle body side system further includes a notification device configured to provide a risk notification to a driver; and
in response to the control unit of the vehicle body side system determining the risk to the vehicle, the control unit of the vehicle body side system is further configured to control the notification device to provide the risk notification as the control for avoiding the risk to the vehicle.

5. The vehicle risk avoidance device according to claim 1, wherein:
the vehicle body side system further includes a brake control device configured to generate a brake force acting on a wheel to generate a brake force acting on the vehicle; and
in response to the control unit of the vehicle body side system determining the risk to the vehicle, the control unit of the vehicle body side system is further configured to output a brake request to the brake control device to generate the brake force acting on the vehicle as the control for avoiding the risk to the vehicle.

6. The vehicle risk avoidance device according to claim 3, wherein:
the vehicle body side system further includes a notification device configured to provide a risk notification to a driver; and
in response to the control unit of the vehicle body side system determining the risk to the vehicle, the control unit of the vehicle body side system is further configured to control the notification device to provide the risk notification as the control for avoiding the risk to the vehicle.

7. The vehicle risk avoidance device according to claim 3, wherein:
the vehicle body side system further includes a brake control device configured to generate a brake force acting on a wheel to generate a brake force acting on the vehicle; and
in response to the control unit of the vehicle body side system determining the risk to the vehicle, the control unit of the vehicle body side system is further configured to output a brake request to the brake control device to generate the brake force acting on the vehicle as the control for avoiding the risk to the vehicle.

* * * * *